United States Patent [19]

Ham et al.

[11] Patent Number: 5,426,862
[45] Date of Patent: Jun. 27, 1995

[54] PANEL-TESTING APPARATUS

[75] Inventors: Chung-sik Ham; Jong-duk Kim; Ho-sung Lee, all of Kyunggi, Rep. of Korea

[73] Assignee: Samsung Corning Co., Ltd., Kyunggi, Rep. of Korea

[21] Appl. No.: 235,687

[22] Filed: Apr. 29, 1994

[30] Foreign Application Priority Data

Jun. 25, 1993 [KR] Rep. of Korea ............... 1993-11720

[51] Int. Cl.[6] ............................................. G01B 7/287
[52] U.S. Cl. ........................................ 33/548; 33/546; 33/552
[58] Field of Search ................... 33/548, 501.05, 501.6, 33/543, 544.5, 545, 546, 549, 550, 551, 552, 555; 209/601, 603

[56] References Cited

U.S. PATENT DOCUMENTS

| | | | |
|---|---|---|---|
| 2,748,490 | 6/1956 | Tandler | 33/552 |
| 4,221,053 | 9/1980 | Bobel, II et al. | 33/552 |
| 4,309,824 | 1/1982 | Fuchs | 33/549 |
| 4,473,953 | 10/1984 | Sauvage | 33/546 |
| 4,914,827 | 4/1990 | Cook | 33/552 |

FOREIGN PATENT DOCUMENTS 198710  11/1983  Japan ........................... 33/546

Primary Examiner—Christopher W. Fulton
Attorney, Agent, or Firm—Christie, Parker & Hale

[57] ABSTRACT

A panel testing apparatus for measuring the curvature of an inner surface, the thickness of an edge portion, and the thickness of a center portion of the panel comprises a lifting device for accepting and transporting the panel to a testing position, and a panel supporting device for maintaining the panel in a predetermined position during testing. The apparatus comprises a panel inner curvature measuring device, edge thickness measuring device, and a center thickness measuring device, each of which using one or more linear variable differential transformers for the purpose of providing panel measurement data. The apparatus further comprises a studpin leveling device for measuring the burial depth of studpins within the panel and simultaneously leveling the studpins to the same height, and a studpin position measuring device for measuring the horizontal and/or vertical placement of the studpins within the panel, each of which using one or more linear variable differential transformers for the purpose of providing studpin measurement data.

20 Claims, 16 Drawing Sheets

PANEL-TESTING APPARATUS

FIELD OF INVENTION

The present invention relates to a panel-testing apparatus. More particularly, it relates to a panel-testing apparatus capable of successively gauging data relating to each thickness of a center and an edge of a panel, a curvature of an inner surface, and a placement and a height of a studpin in a color picture tube (CPT).

BACKGROUND

A color picture tube includes a panel, a funnel made of glass, and a neck portion. Red, green and blue phosphor dots are applied to the inner surface of the panel to form a fluorescent surface, and a shadow mask assembly is disposed at a predetermined space with the phosphor dots. A studpin is buried and mounted on a predetermined location of the inner surface of the panel in order to install the shadow mask assembly.

In the color picture tube, electron beams are emanated from respective electron guns, and impinge upon corresponding phosphor dots on the fluorescent surface through an aperture of the shadow mask assembly. The fluorescent surface luminates by the electron beams and this light becomes pixels that form an image.

Since the image of the color picture tube is watched through an outer surface of the panel, the thickness and curvature of the inner surface of the panel have a great influence on the quality of the image. Besides, since the studpin determines a relationship of the placement of the shadow mask assembly as to electron beams, a high quality image may not be produced if the shadow mask is not in its predetermined location. For such reasons, it is desired that the standard of the color picture tube panel be closely examined during the processes of inspection.

During the inspection process the standard of the panel is examined by measuring the thickness of an edge portion of the panel and a thickness of a center portion or the panel is typically measured. A linear variable differential transformer (LVDT) is typically used for measuring the standard of a color picture tube panel. The LVDT is a well known device that displays an electrical signal of inductance when it is placed into contact with the thing being measured. The electrical signal displayed by the LVDT varies depending on the distance between the LVDT and the thing being measured. Accordingly, an operator can arrange a number of LVDTs to measure the thickness of the panel at different locations as well as the curvature of the inner surface of the panel.

However, the use of LVTDs to accurately measure the standard of a color picture tube panel requires that the panel be tested a minimum of three times, each time requiring the involvement of an operator to insure the setup of the panel and the LVTDs. Accordingly, the use of LVTDs to measure the standard of a panel is a manpower intensive operation having a high inspection time per panel.

It is, therefore, desirable that a panel-testing apparatus for a color picture tube be constructed that is capable of successively and automatically measuring data of the thickness of the edges and a center portion of the panel, the curvature of an inner surface of the panel, and the position of a studpin in a manner that simplifies the testing processes, reduces testing time per panel, improves operator productivity, and reduces manpower.

SUMMARY OF THE INVENTION

There is therefore, provided in the practice of this invention a panel-testing apparatus for a color picture tube for measuring the curvature of inner and outer surfaces of a panel made in a conventional way, the burial location of studpin, and the thickness of a central surface of the panel. The panel-testing apparatus comprises: a lifting means for accepting the panel from a supplying position and transporting the panel to a testing position; a panel-inner curvature measuring means contacting a plurality of curvature detecting linear variable differential transformers, the transformers measuring the inner curvature of the panel after being placed into the testing position; an edge measuring means for measuring the thickness of an edge portion of the panel by contacting an inner and outer surface of the panel with an inner and outer variable differential transformer, respectively; a studpin leveling means for measuring a burial depth of each studpin by using a depth detecting linear variable differential transformer simultaneously with placing a plurality of the studpins buried on the panel to the same height; a studpin position measuring means for measuring the horizontal and/or vertical placement of the studpin by horizontal and vertical linear variable differential transformer; a center surface measuring means contacting the outer central surface of the panel and measuring an error of the thickness of the outer central surface of the panel; and a plurality of guiders for guiding ascent and descent of the panel onto and away from the apparatus, respectively.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 14:
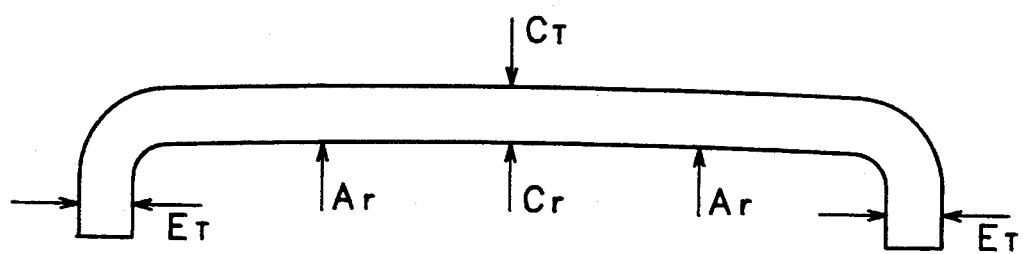
FIG. 14 shows a general measured portion in connection with a standard test of a panel.

Generally, the standard of a color picture tube panel is closely examined during the inspection process by measuring the the thickness of an edge portion $E_t$ measured from two points per side of the panel and a thickness of a center portion $C_t$ measured from a screen-side center of the panel, as shown in FIG. 14. A curvature of the inner surface of the panel is gauged by a height of the center portion $C_r$ measured from a predetermined level and a height of four points around the center, $A_r$.

Figure 15:
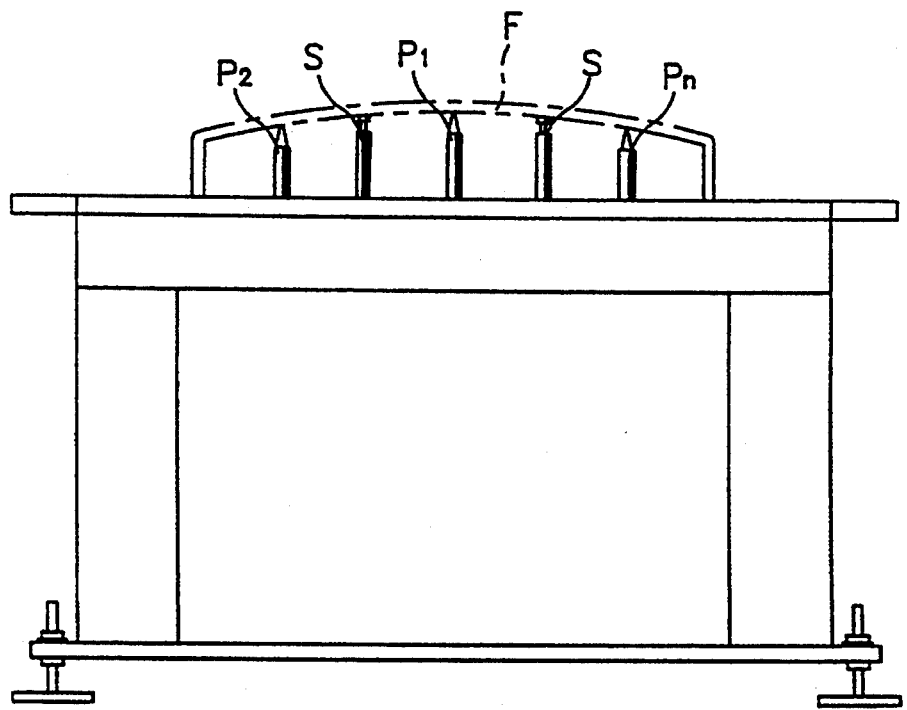
FIG. 15 is a front view showing a conventional embodiment of an apparatus for measuring a curvature of the inner surface of a panel.

Linear variable differential transformers (LVDT) are typically used to measure the standard of a color picture tube panel. The LVDT is a well known device that displays an electrical signal of inductance when it is placed into contact with the thing being measured. FIG. 15 shows a conventional device suitable for measuring a curvature of the inner surface of the panel. A plurality of LVDTs (P) are arranged vertically on a suitable table. The tip of each LVDT (P) is arranged so that each has a different height from the others to have a predetermined function of curvature. A panel F is loaded on LVDTs (P) arranged in this way and a buffer S supports the panel F to a predetermined height. If the curvature of the panel F conforms to the predetermined function, the value measured by all the LVDTs (P) becomes "0" (zero). If the curvature of the panel F departs from the predetermined function, the value measured by the LVDT or LVDTs (P) contacting that section of the panel does not read "0", thereby indicating an inferior good.

In order to achieve accurate results by using the conventional panel testing device described above it is necessary that each panel undergo at a minimum of three tests, each requiring the attendance of an operator and increased inspection time per each panel.

Figure 1:
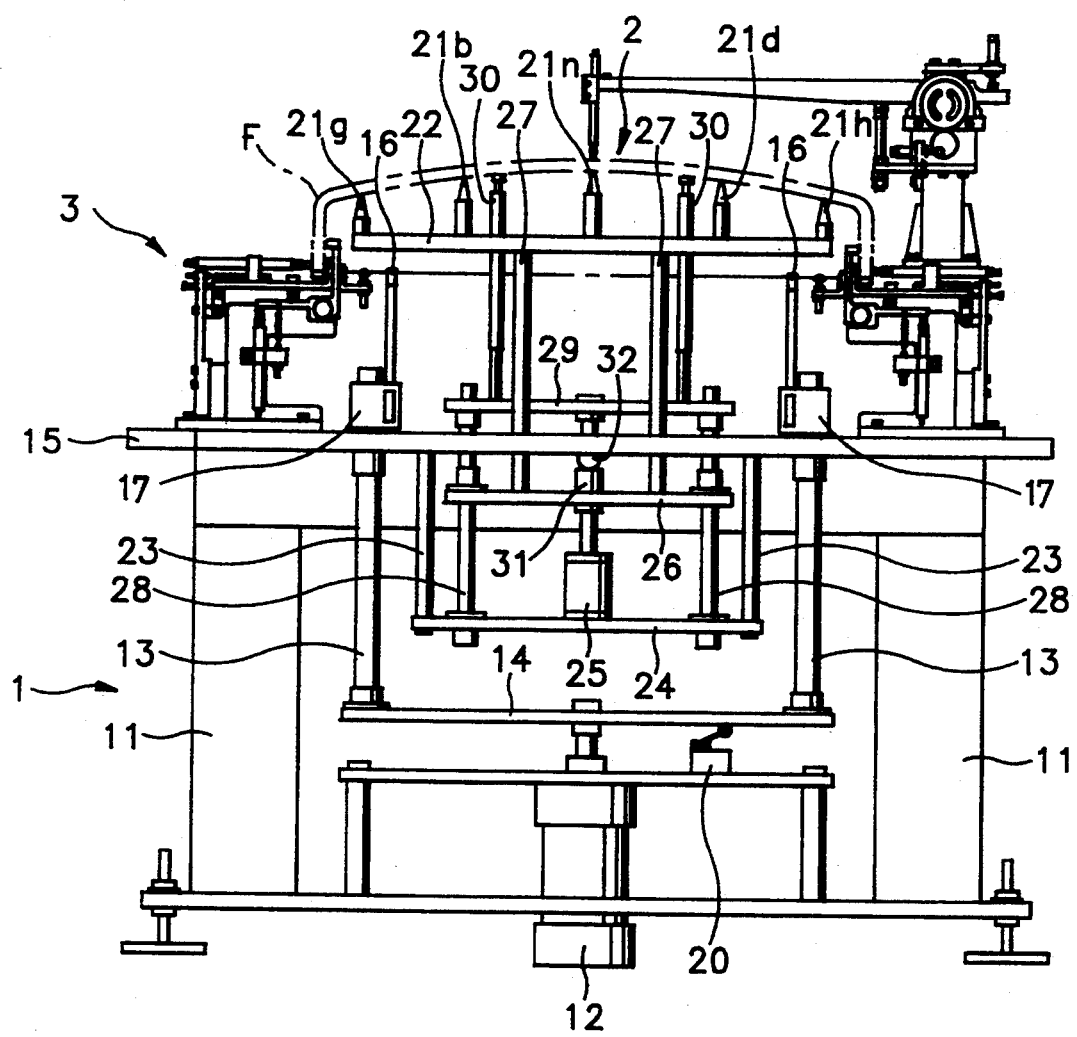
FIG. 1 is a front view showing a structure of a panel-testing device constructed in accordance with the present invention.

FIG. 1 show a panel-testing apparatus constructed according to principles of the present invention comprising a panel-lifting means 1, a panel-inner curvature measuring portion 2 mounted liftably on a central and upper portion of the apparatus, and several kinds of panel-edge measuring means disposed on the upper portion of the panel-lifting means 1.

The panel-lifting means 1 has a base frame 11 and a transfer cylinder 12 is fixedly disposed on a central bottom of the base frame 11 to serve as a panel-loading means.

A piston rod of the transfer cylinder 12 is connected to a central portion of a transfer plate 14 having arms 13 respectively mounted on each of four-side corner portions. The above-mentioned four arms 13 extend upwardly and longitudinally to penetrate a bed 15 of the base frame 11. The upper ends of each arm 13 are fixedly attached to respective panel receptors 16 by holders 17.

Figure 2:
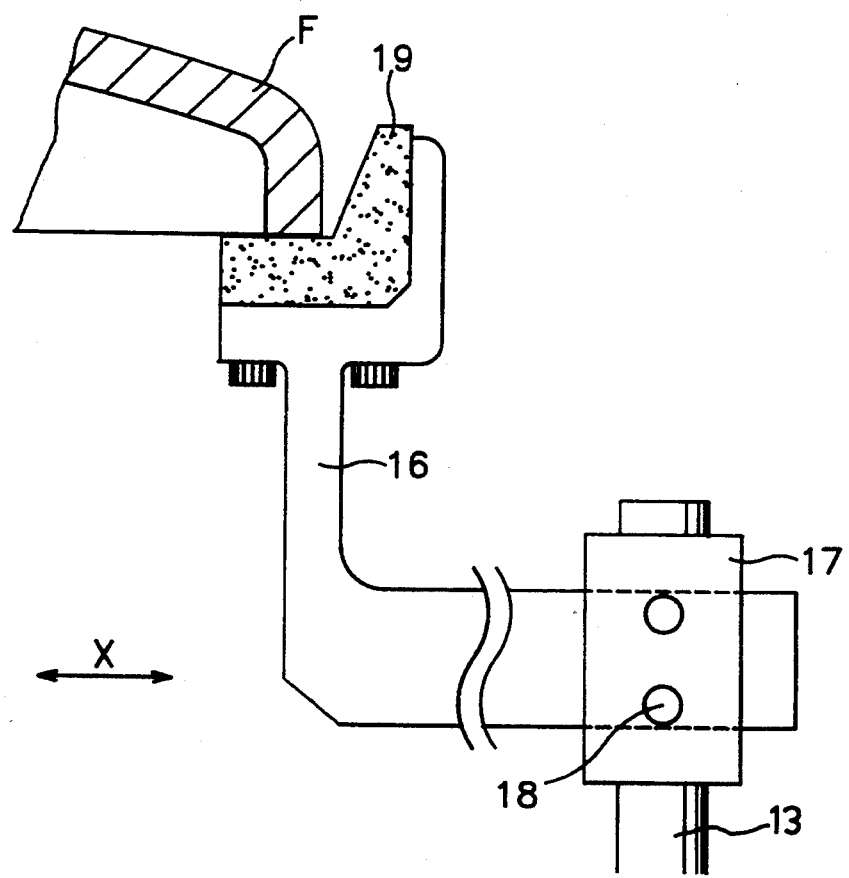
FIG. 2 is a partially-enlarged view showing a coupling of a panel receptor and a holder of FIG. 1.

FIG. 2 shows the connection of an arm 13 to a respective panel receptor 16 via a holder 17. A lower end of the elbow-shaped panel receptor 16 is placed within a hole formed in the holder 17 and fixed into place by set screws 18. The length of the panel receptor 16 is variable in an X-direction of the drawing thereby, and such a panel receptor may be applied regardless of the standard of the panel F.

A pad 19 is attached to an end portion of the panel receptor 16 to prevent damage of the edges of the panel F when the panel receptor 16 contacts the panel F. A sensor 20 is installed underneath the transfer plate 14 and perceives movement of a bottom dead point of the transfer plate 14 to emanate an electrical signal.

The panel-inner curvature measuring means 2 disposed on the upward center of the base frame 11 includes a gauge board 22 having a number of curvature detecting LVDTs 21a to 21n. The LVDTs are arranged respectively at the central portion of the panel F and at its eight peripheral portions.

Figure 3:
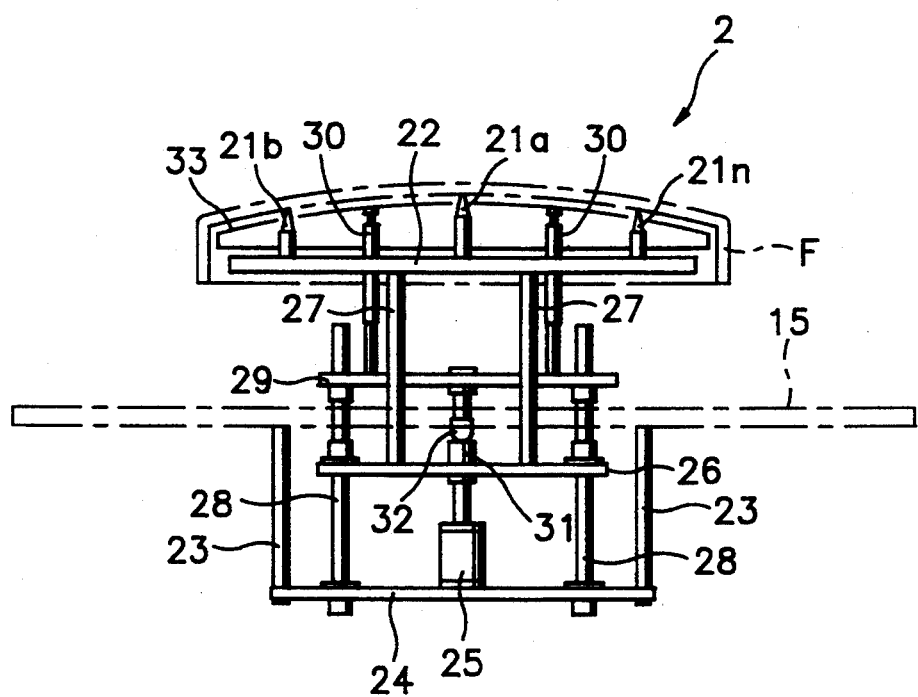
FIG. 3 is a partially-enlarged view showing the structure of a panel-inner curvature measuring means for FIG. 1.

FIG. 3 is a partially-enlarged view showing the structure of the panel-inner curvature measuring portion 2 of the panel-testing apparatus. Suspension rods 23 extend vertically under the bed 15, and a lifting cylinder 25 is disposed in a vertical direction on a mounting board 24 supported by the suspension rods 23. The piston rod of the lifting cylinder 25 is connected to a bottom of a lifting board 26 to move the lifting board up and down. Supporting rods 27 are disposed vertically to support the bottom of the gauge board 22. The lifting board 26 ascends and descends along guide bars 28 that each extend vertically from the mounting board and are parallel with the suspension rods 23 under the bed 15. The guide bars 28 extend through a guide board 29 fixedly mounted over the bed 15, and are guided by the mounting board 24 and the guide board 29 at the time of lifting. The guide board 29 has vertically-extending posts 30 on at least four portions. A buffer stopper 32 contacts a center protrusion 31 of the lifting board 26 to limit a top dead point of the lifting board 26. Each post 30 of the guide board 29 supports a shield 33 covering portions except the above-mentioned LVDTs 21a to 21n.

Figure 4:
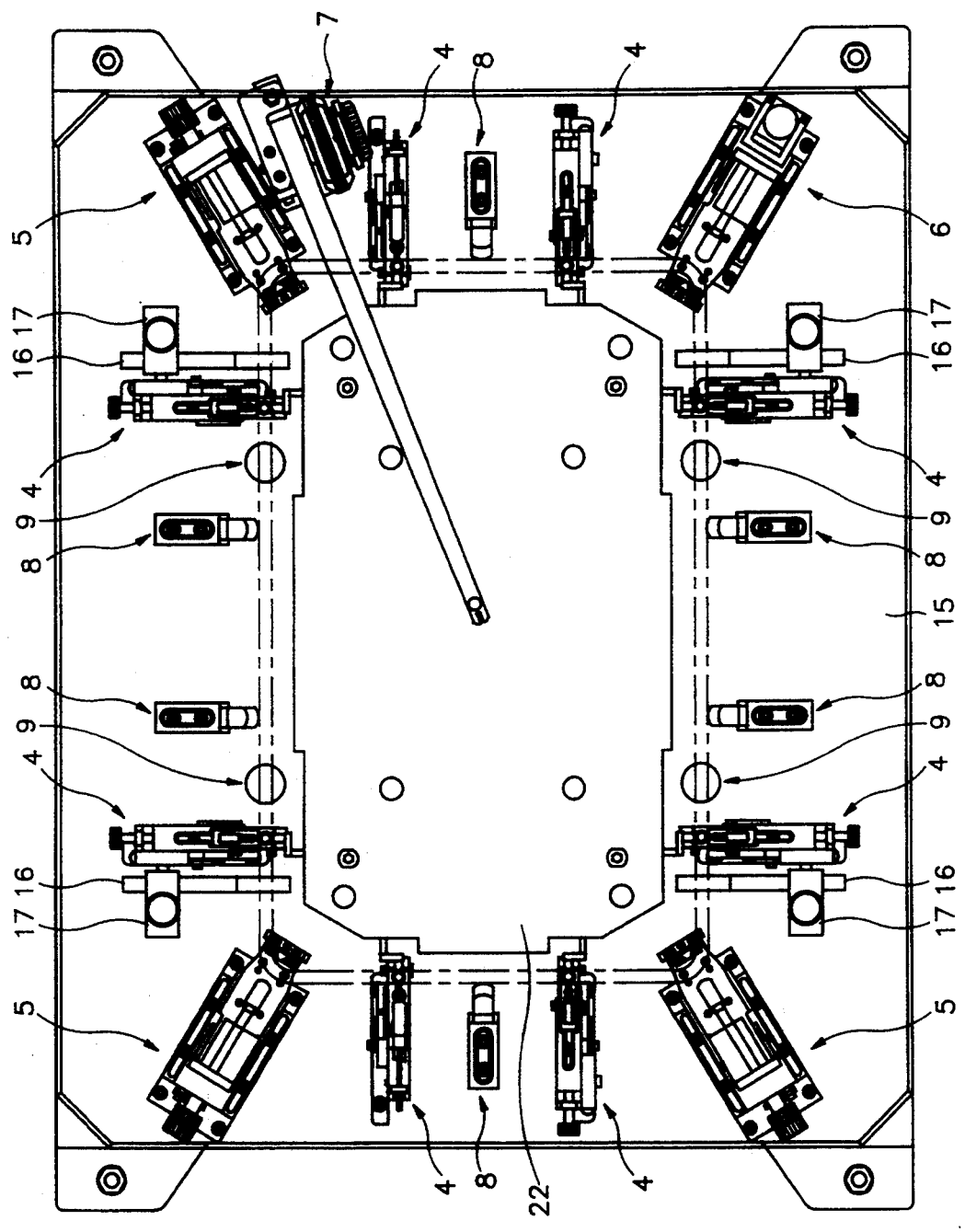
FIG. 4 is a plan view of FIG. 1 for showing an example of arrangement of several means related to the measurement of edges of a panel.

Referring again to FIG. 1, edge measuring means are arranged at predetermined positions around the gauge board 22 over the bed 15. The edge measuring means are, as shown in FIG. 4, characterized as four pairs of edge measuring means 4 disposed to be opposite to each other on two positions per side; three studpin leveling means 5 disposed diagonally on three positions of edges of the gauge board 22; a studpin position measuring means 6 disposed on a rest edge of the gauge board 22; and a center surface measuring means 7 for measuring a thickness of the center of the panel F. A plurality of guiders 8 are positioned on the gauge board to guide and align the panel F so that it is in a correct position for testing.

Figure 5:
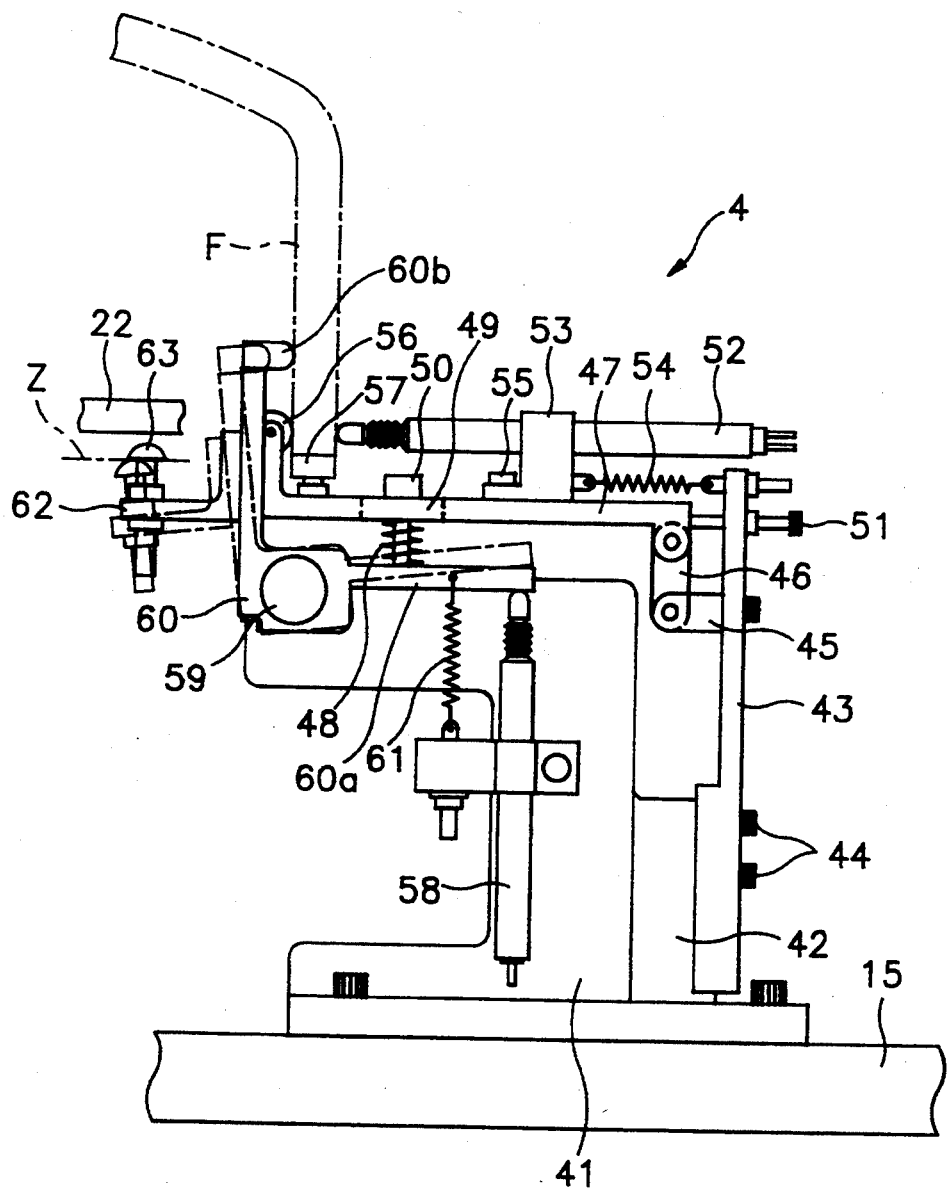
FIG. 5 is a partially-enlarged sectional view showing a structure of an edge measuring means depicted in FIG. 4.

FIG. 5 depicts the structure of the edge measuring means 4. A body 41 attached to the topside of the bed 15 has a rail 42 integrally fixed on its one side. A jack plate 43 is mounted on this rail 42 such that the position of the jack plate 43 is controllable up and down and fixed by a pair of set screws 44. A horizontal arm 45 is formed in an orthogonal direction on an almost central portion of the jack plate 43, and a link 46 is inserted to the end of this horizontal arm 45 to hinge one end of a bracket 47 formed over the body 41. The bracket 47 is suspended by a spring 48 disposed on the top side of the body 41 and is tightened by an adjusting bolt 50 penetrating a slot 49. The adjusting bolt 50 can control the horizontal position of the bracket 47. The horizontal position of the bracket 47 may be controlled by changing the gradient of the link 46 hinged on the horizontal arm 45 by a link adjuster 51 on the upper end of the jack plate 43, instead of the method of using the adjusting bolt 50.

An air-probe holder 53 is slidably installed on the top side of the bracket 47 to contact an outside air-probe 52 vertically with respect to the outer circumference of the panel F. The air-probe holder 53 receives a force pulling the air-probe holder 53 in the direction of the jack plate 43 by the spring 54. A set screw 55 tightened by the bracket 47 fixes the position of the outside air-probe 52. The outside air-probe 52 contacts an outer circumference of the edges of the panel F and measures data of the thickness.

A roller 56 is mounted on the front end of the bracket 47 opposite to the outside air-probe 52. When the panel F descends, the outside air-probe 52 is on the rearward-driving position, and the roller 56 is pushed to guide the outside air-probe 52. An edge prop 57 is installed between the roller 56 and the outside air-probe 52. When the panel F is set on the edge prop 57, the outside air-probe 52 operates forward to contact the outer circumference of the panel F.

An inside air-probe 58 for measuring data concerning a center point of the panel F is installed on the body 41. The inside air-probe 58 links the L-shape lever 60 supported to be rotatable in the front of the body 41 by an axial member 59. One end 60a of the L-shape lever 60 is pulled by a spring 61 to contact the upper end of the inside air-probe 58 all the time, and the other end 60b remote from the end 60a extends in the direction of the roller 56 of the bracket 47.

If the other end 60b of the L-shape level 60 contacts the inner circumference of the edges of the panel F and is displaced, the one end 60a forms a link with the inside air-probe 58. A protrusion 62 extends at one side of the L-shape lever 60, and a height-adjuster 63 inserted into the lever 60 to a height equal to the bottom of the gauge board 22 is mounted on the protrusion 62. If the gauge board 22 descends to a height of "Z", the height-adjuster 63 is pressed to move the L-shape lever 60 counterclockwise in FIG. 5. Thus the end 60a of the L-shape lever 60 becomes more distant from the inside air-probe 58, simultaneously with resisting the spring 61, in order not to be an obstacle to the insertion of the panel F. After that, if the gauge board 22 ascends again, the other end 60b of the L-shape lever 60 comes into contact with the inner circumference of the edges of the panel F by the resilience of the spring 61. The movement of the L-shape lever 60 is indicated as data relating to a center point of the inner circumference of the panel F in the inside air-probe 58. This data shows a thickness of the edges, together with the data of the outside air-probe 52.

Figure 6:
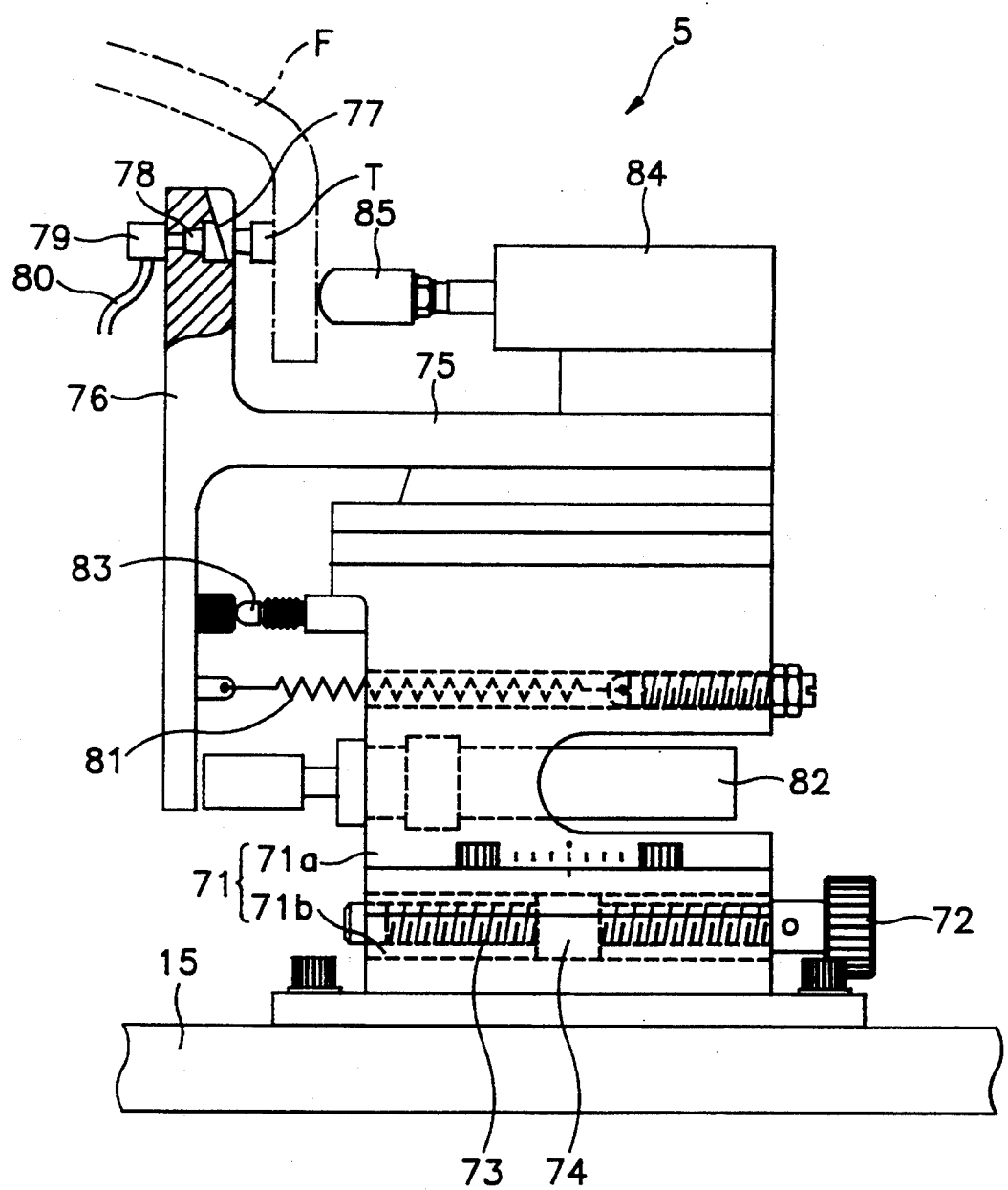
FIG. 6 is a partially-enlarged view depicting a studpin leveling means.

FIG. 6 shows a studpin leveling means 5 disposed on three edges of the bed 15. A body 71 of the studpin leveling means 5 is formed to be divided into upper and lower bodies 71a, 71b. The lower body 71b is fixed on a predetermined position of the bed 15, and the upper body 71a is disposed to move slidably on the lower body 71b. The slidable movement of the upper body 71a as to the lower body 71b is possible by operating a knob 72 mounted on the outside of the lower body 71b. That is, as a nut portion 74 of the upper body 71b moves along a screw 73 extending from the knob 72, the studpin leveling means 5 may be applied without regard to the standard of the panel F tested.

A notch indicating the distance of the movement is marked on the outside of the upper body 71a, and a base line is marked on the lower body 71b such that the distance of the movement of the upper body 71a may be observed in this embodiment. The upper body 71a of the body 71 slidably supports a ram 75. Substantially, the upper body 71a and the ram 75 is connected by a dove-tail joint type that is generally used. A studpin chucking board 76 extending orthogonally is formed on a free end of the ram 75. A groove 77 for guiding the studpin T of the panel F is formed on the chucking board 76. A path 78 is formed on the center of the groove 77 toward the other side of the chucking board 76 to be connected to a customary pressure switch 79. The pressure switch 79 joins an air-supplying pipe 80 and is supplied with a pressured air. This pressure switch 79 senses whether the pressure is filled in the path 78 and then turns on when the pressure is filled therein. A spring 81 is connected between the lower part of the chucking board 76 and the upper body 71a to apply resilience to the ram 75 all the times. An ejecting cylinder 82 is disposed on the upper body 71 to be opposite to the lower part of the chucking board 76.

A depth-detecting LVDT 83 is disposed to contact the lower part of the chucking board 76 over the ejecting cylinder 82 in order to measure data relating to the position of the studpin T. A chucking cylinder 84 is fixedly disposed over the ram 75 to be opposite to the chucking board 76, and drives a chucking point 85 forward and rearward to the outer circumference of the panel F. The panel F is loaded in the studpin leveling means 5 when the chucking cylinder 84 operates rearward and displaces the chucking point 85 to be far from the upper part of the chucking board 76. If the chucking cylinder 84 operates forward, the loaded studpin T of the panel F is inserted to the groove 77 of the chucking board 76.

The insertion of the studpin T is carried out simultaneously on three edges of the panel F, and all the studpins T have the same height. An electrical signal produced by the chucking board 76 interfaces with the corresponding depth-detecting LVDTs 83 and becomes a measured value indicating a burial depth of the corresponding studpin T. The burial depth of each studpin T is a function representing the radius of the arrangement of all the studpins T to the center of the gauge board 22. Therefore, the burial depth can be measured whether a center point of the arrangement of all the studpin T is consistent with a center point of the panel F. If the studpin T is exactly inserted to the groove 77, the pressured air supplied through the air-supplying pipe 80 cannot be exhausted well via the path 78, and the pressure of the air fills the path 78. If the pressure switch 79 senses the pressure of the air filled in the path 78, the switch is turned on to transmit an electrical signal, and the electrical signal becomes a signal checking if the studpin T is buried on a corresponding part of the panel F.

Once the measurement of the studpin T burial depth is completed, the ejecting cylinder 82 operates forward to push the ram 75, moving the upper part of the chucking board 76 away from the panel F and releasing the studpin T from insertion within the groove 77. If the panel F rises to a predetermined position and the ejecting cylinder 82 operates rearward, the ram 75 is pulled by the spring 81 and returns to its first location.

Figure 7A:
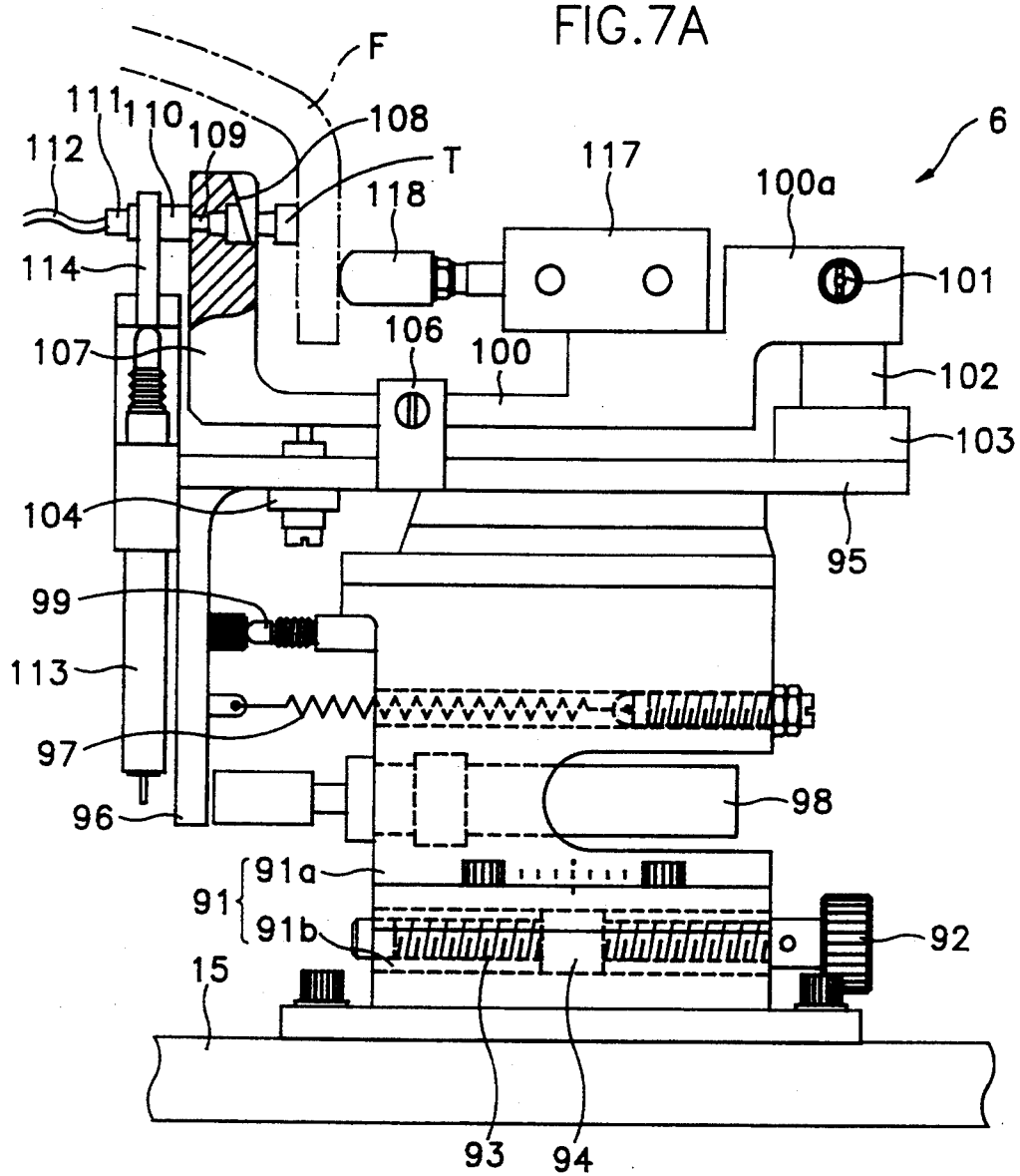
FIG. 7A is a partially-enlarged view showing a studpin position measuring means depicted in FIG. 4.
Figure 7B:
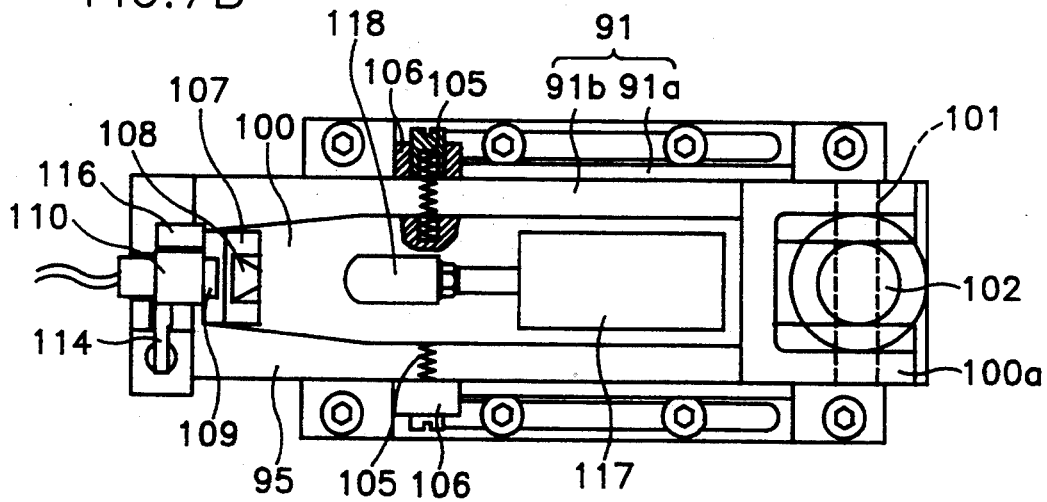
FIG. 7B is a plan view of FIG. 7A.
Figure 7C:
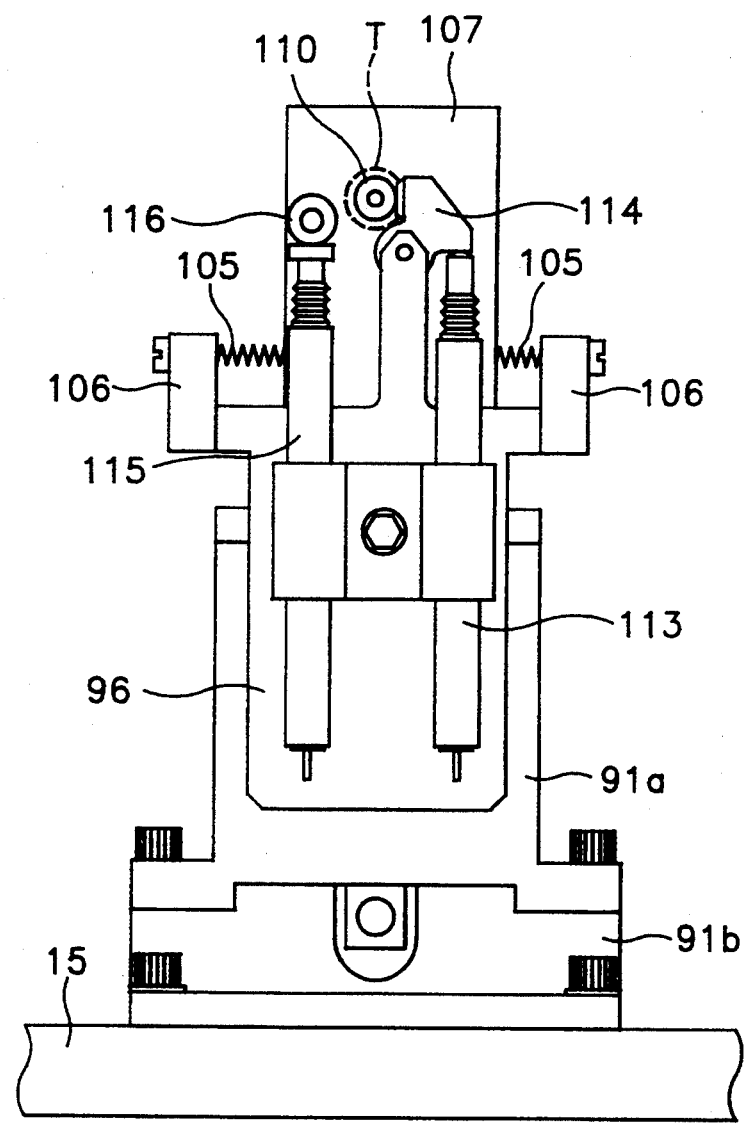
FIG. 7C is a side view the studpin position measuring means as taken from the left side of FIG. 7A.

FIGS. 7A, 7B and 7C depict an example of the studpin-position measuring means 6 disposed on the rest edge of the bed 15. Referring to FIG. 7A, a body 91 of the studpin-position measuring means 6 includes upper and lower bodies 91a and 91b, like the studpin leveling means 5. The lower body 91b is fixed on a predetermined position of the bed 15, and the upper body 91a is installed slidably over the lower body 91b. The upper body 91b may be moved relative to the lower body 91a by the screw-movement of a nut 94 of the upper body 91b along a screw 93 extending from a knob 92 by operating the knob 92 disposed on the outside of the lower body 91b. Accordingly, the studpin-position measuring means 6 may be applied without regard to the standard of the panel F to be tested, together with three studpin leveling means 5. A notch indicating the distance of the movement is marked on the outside of the upper body 91a, and a base line is marked on the lower body 91b such that the distance of the movement of the upper body 91a may be observed in this embodiment.

The upper body 91a of the body 91 supports a ram 95 slidably. Substantially, the upper body 91a and the ram 95 are connected together by a dove-tail joint method, as in the studpin leveling means 5. A vertical plate 96 extending downward is formed on one end of the ram 95. This vertical plate 96 corresponds to a lower part of the chucking board 76 compared with the studpin leveling means 5. Like the studpin leveling means 5, a spring 97 is connected between the vertical plate 96 and the upper body 91a to apply resilience to the ram 95 all the time. An ejecting cylinder 98 is disposed to be opposite to the vertical plate 96 on the upper body 91a. A depth detecting LVDT 99 is located above the ejecting cylinder 98 and is installed to contact the vertical plate 96 for purposes of measuring data relating to a center of the arrangement of the studpin T.

Figure 8:
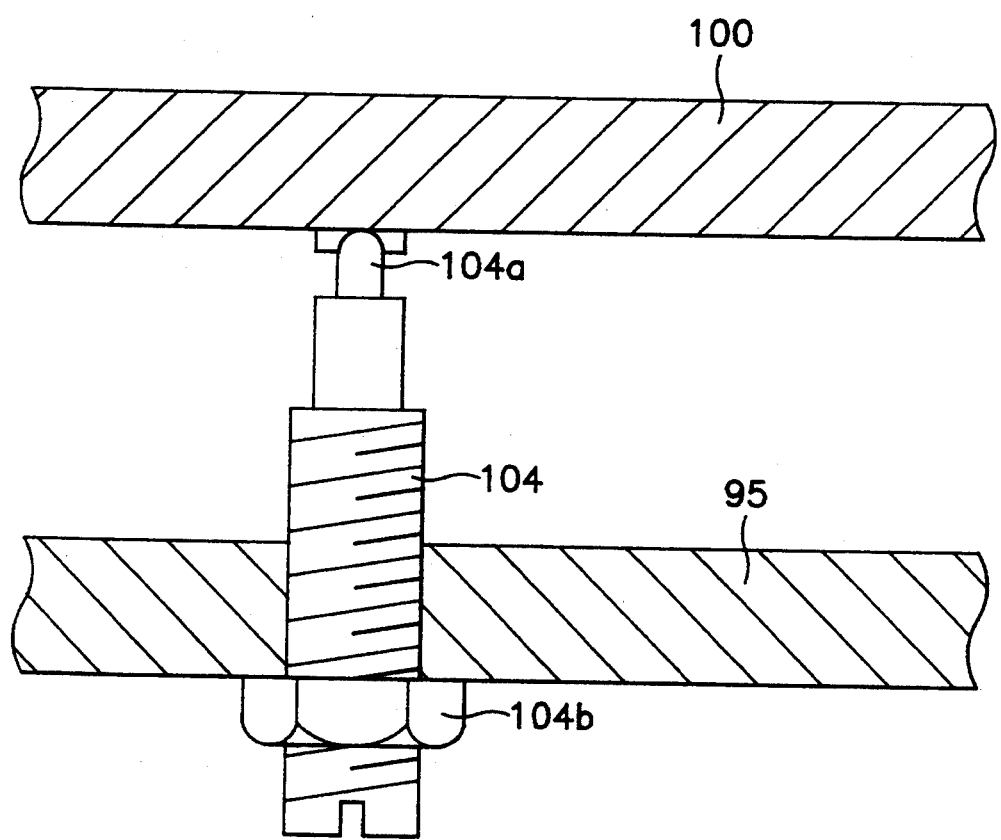
FIG. 8 is an enlarged sectional view showing a buffer depicted in FIG. 7A.

The studpin-position measuring means 6 comprises a float plate 100 mounted on the top of the ram 95 to be able to pitch and yaw, unlike the studpin leveling means 5. The float plate 100 has a fork 100a on one side end. This fork 100a is hinged with an arbor 102 by a pin 101, and can rotate upward and downward. The arbor 102 is pivoted by a journal bearing 103 attached to one side end of the top side of the ram 95, and the float plate 100 is supported to be rotatable in a lengthwise direction. The float plate 100 may pitch and yaw over the ram 95. A free end of the float plate 100 is supported to a predetermined height by a buffer 104 fixedly installed in the ram 95. The buffer 104 is, as shown in FIG. 8, attached to the ram 95 such that its protruded end 104a supports elastically the bottom of the float plate 100. The height of the free end of the float plate 100 may be controlled by relaxing and operating a lock nut 104b of the buffer 104.

Both side surfaces of the float plate 100 are, as depicted in FIG. 7B, pressed by a pair of return springs 105, and the float plate 100 is disposed on a predetermined location all the time. The return springs 105 pressing both side surfaces of the float plate 100 are respectively supported by a pair of spring seats 106 installed on side surfaces of the ram 95. In addition, the spring seats 106 include a screw for adjusting a horizontal position of the float plate 100 by controlling the elasticity of the return springs 105.

A studpin detecting board 107 extending orthogonally is formed on a free end of the float plate 100. A groove 108 is formed to guide the studpin T of the panel F on the upper part of the studpin detecting board 107, and a path 109 is formed on the center of the groove 108. The path 109 opens to the center of a rectangular protrusion 110 formed on the other side of the studpin detecting board 107, and an air-supplying pipe 112 is connected thereto by a pressure switch 111. The center of the rectangular protrusion 110 and the center of the groove 108 must coincide together. A horizontal detecting LVDT 118 attached to the vertical plate 96 of the ram 95 is disposed around the rectangular protrusion 110 formed on the other side of the studpin detecting board 107.

FIG. 7C depicts the structure of the other side of the studpin detecting board 107. The horizontal detecting LVDT 113 is disposed to contact the outer circumferential surface of the rectangular protrusion 110 by inserting a mediator 114 hinged on the upper part of the vertical plate 96, and measures an error that deviates laterally from the regular position.

Another vertical detecting LVDT 115 is disposed in parallel with the horizontal detecting LVDT 113. This vertical detecting LVDT 115 contacts the tip 116 adjacent to the rectangular protrusion 110 of the studpin detecting board 107 to measure an error that deviates up and down from the regular position.

Referring again to FIG. 7A, a chucking cylinder 117 is fixedly disposed on a location opposite to the studpin detecting board 107 at the upper surface of the float plate 100 to move forward and rearward a chucking point 118 toward the outer circumferential surface of the panel F. In the studpin position measuring means 6, the float plate 100 is supported by the buffer 104 disposed on the ram 95, and is mounted at a predetermined height to be able to pitch and roll. The posture of the float plate 100 is adjusted in order that a center of a rectangular protrusion 110 formed on the other side of the detecting board 107 agrees with a center of the right location of the studpin T by using the buffer 104 and a control screw of the spring seat 106. The panel F is loaded on the float plate 100 when the chucking cylinder 117 is driven rearward and the chucking point 118 is far from the upper part of the studpin detecting board 107. If the chucking cylinder 117 is driven forward, the studpin T of the panel F is inserted to the groove 108 of the studpin detecting board 107. In this manner, if the center of the groove 108 does not agree with the center of the studpin, the groove 108 leads to the fixed studpin T to perform the insertion. At this point, the location of the float plate 100 is changed. The change of the location is shown as a longitudinal and/or lateral displacement of the studpin detecting board 107.

In case of the lateral displacement of the float plate 100, the displacement is shown as a lateral movement of the rectangular protrusion 110, which is measured by the horizontal detecting LVDT 113 by inserting the mediator 114 contacting the side surface of the rectangular protrusion 110. The longitudinal displacement of the float plate 100 is measured by the vertical detecting LVDT 115 contacting a tip 116. The depth-detecting LVDT 99 contacting the lower part of the vertical plate 96 measures a burial depth of the studpin T. A value obtained by the depth-detecting LVDT 99 also serves as data determining whether the center of the arrangement of all the studpin T agrees with the center of the panel F, together with a signal detected by all the depth-detecting LVDT 83 of the studpin levelling means 5. The pressure switch 111 senses if the studpin T is inserted correctly into the groove 108, like the case of the studpin leveling means 5. If the above operation is finished, the ejecting cylinder 98 is driven forward and pushes the ram 95. The upper part of the studpin detecting board 107 is pushed away far from the panel F, and the studpin T inserted to the groove 108 is removed thereof. If the ejecting cylinder 98 is driven rearward again, the ram 95 is pulled by the spring 97 to go back to its first location.

Figure 9:
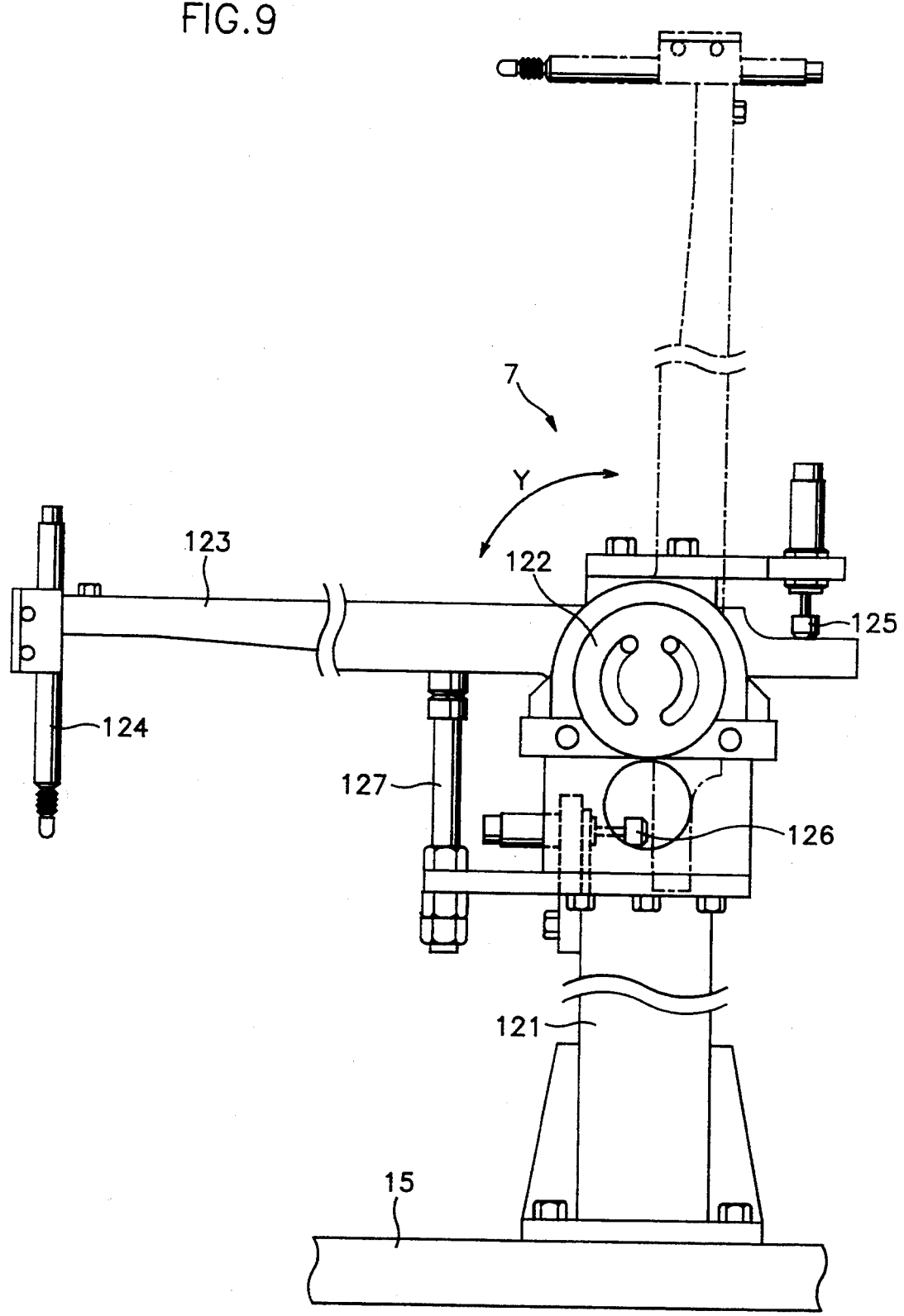
FIG. 9 is a side view showing the structure of a center portion measuring means depicted in FIG. 4.

FIG. 9 depicts in detail the center surface measuring means 7 appeared in FIG. 4. The center surface measuring means 7 includes a column 121 fixedly mounted on the bed 15, a rotary cylinder 122 attached to the upper end of the column 121, and an arm 123 extending horizontally from the rotary cylinder 122. The arm 123 turns in a vertical and horizontal direction indicated by "Y" in the drawing by the rotary cylinder 122 so that a center LVDT 124 attached orthogonally to a free end of the arm 123 contacts the center of the outside surface of the panel F. An electrical signal produced from the center LVDT 124 represents data relating to a thickness of the center of the panel F, together with an electrical signal produced from the center LVDT 20a of the panel-inner curvature measuring means 2. The end of the above arm 123 is restrained by a stopper 125 when the arm is in a leveling posture. When the arm is in a vertical posture, the end of the arm 123 is restrained by a stopper 126. Preferably, both the stoppers 125 and 126 have a shock-absorbing function. The height of the arm 123 may be properly controlled by a height controller 127 mounted vertically on the column 121.

Figure 10:
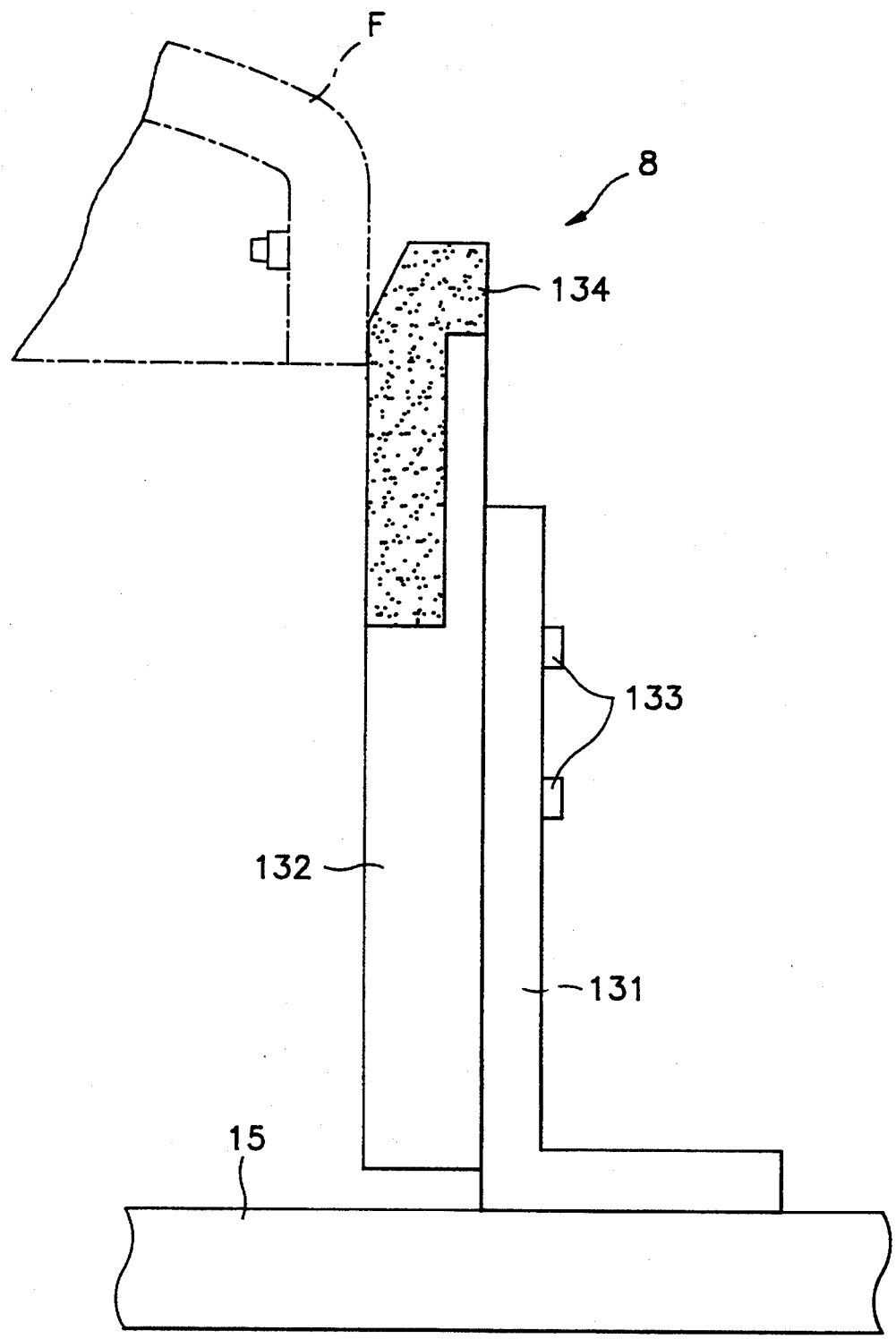
FIG. 10 is an enlarged side view showing a guider depicted in FIG. 4.

FIG. 10 is a partially-sectional view of the structure of the guider 8 appeared in FIG. 4. The guider 8 includes an "L" shape bracket 131 fixed on a predetermined location of the bed 15. A guide bar 132 is connected to a side of the bracket 131 opposite to the panel F by fixing bolts 133 in order that the height of the guide bar 132 may be controlled. A pad 134 that contacts the panel F and guides the guide bar 132 is attached to the upper part of the guide bar 132. The guider 8 is installed on six positions around the bed 15 as shown in FIG. 4 in this embodiment and guides the panel F supplied from the above.

In the panel-testing apparatus constructed according to principles of this invention all the LVDTs are set to indicate "0" when the portions of the panel F that are measured are regular. When the electrical signal measured by any one of the LVDTs is not "zero", the panel is inferior. In addition, the permissible error of all the LVDTs is determined as 5/100 in general.

Figure 11:
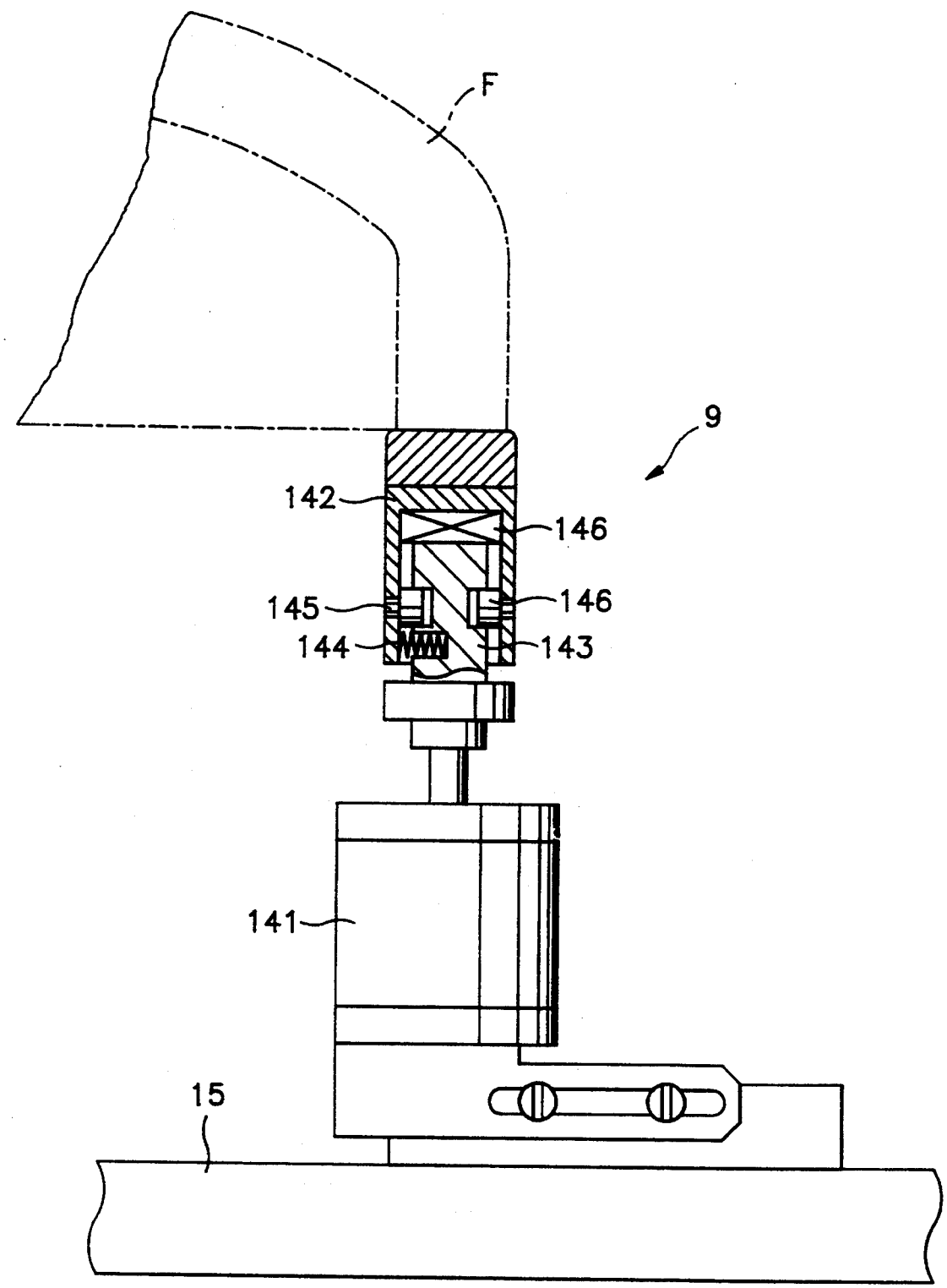
FIG. 11 is a sectional view showing an example of a panel supporting means suitable for the present invention.

In order to maintain the panel F at a predetermined location during the testing operation a plurality of panel supporting means 9 are disposed on the bed 15, as shown in FIG. 4. FIG. 11 shows an example of the structure of the panel supporting means 9. A balance cylinder 141 is mounted vertically on the bed 15, and a shank 143 on which a shaking cap 142 is put is formed on the piston rod of the balance cylinder 141. A groove 144 is formed on the outer surface of the shank 143, and a roller 145 having the shaking cap 142 on its inner circumference is inserted into the groove 144. At least one pair of rollers 145 are disposed. The shank 143 and shaking cap 142 are connected integrally by the roller's being inserted into the groove 144.

A bearing 146 is inserted between the shaking cap 142 and the shank 143, making the shaking cap 142 rotatable about the shank 143. One side of the inner circumference of the shaking cap 142 is pressed by a spring 147, and the shaking cap 142 always returns to the horizontal posture. The shaking cap 142 supports the descending edges of the panel F. The panel F remains at a predetermined location by supplying the balance cylinder 141 continuously with pressed air of pressure that can support the load of the panel F applied to the shaking cap 142. Each measuring portion of the panel F may be controlled integrally by a programmable logic controller.

Figure 12:
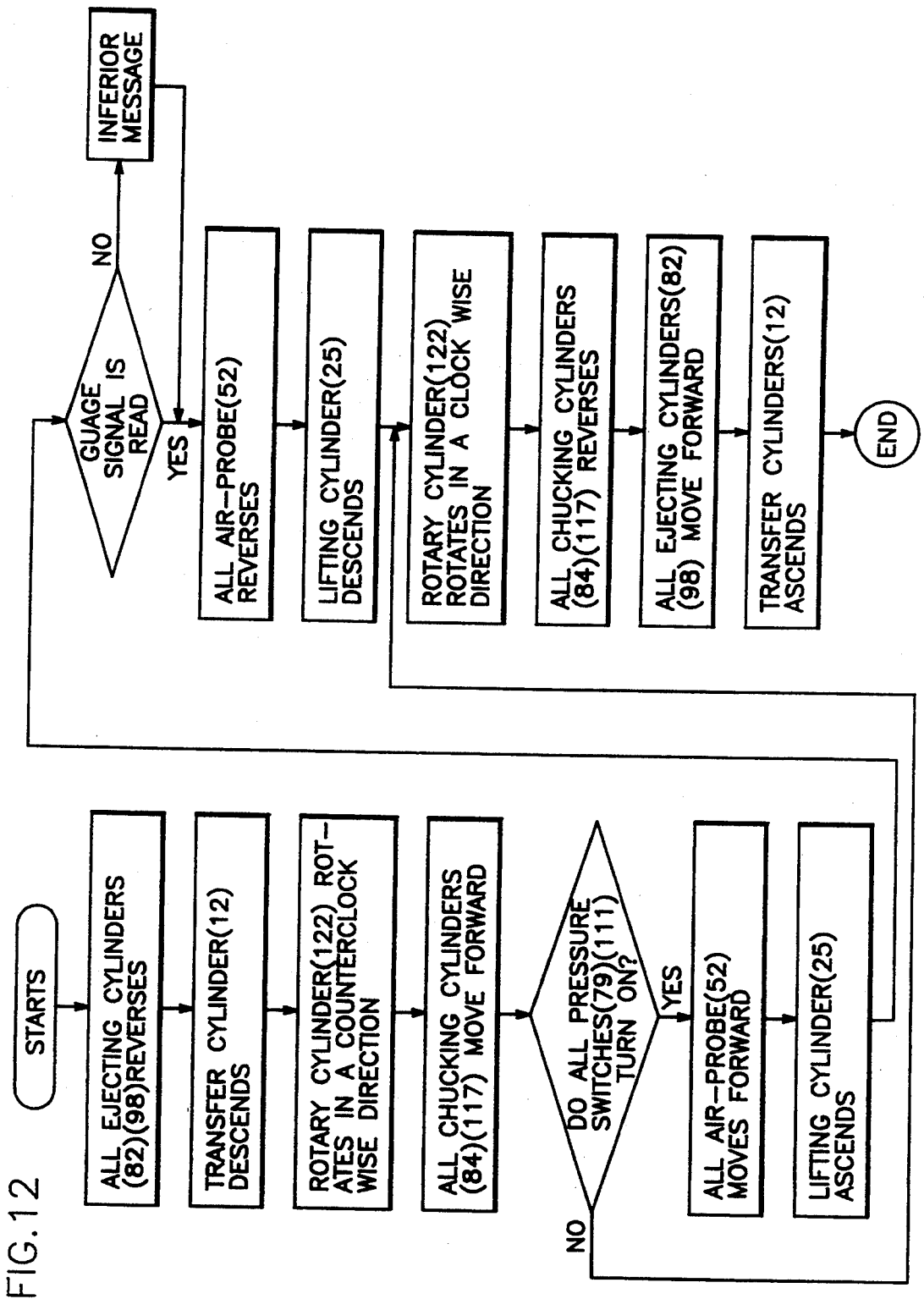
FIG. 12 is a flow chart showing an operational relation of the present invention.

A control process for operating the apparatus is shown in FIG. 12. After an operator places the panel F on the panel receptors 16, causing the panel receptors to descend, the operator activates a start switch, all the ejecting cylinders 82 and 98 operate rearward. After that, the transfer cylinder 12 descends, and the panel F is disposed on the top side of the bed 15. At this point, the panel F is supported at a predetermined height within the apparatus primarily by the shaking cap 142 of the panel supporting means 9 and secondarily by the edge prop 57 of the edge measuring means 4.

The rotary cylinder 122 rotates in a counterclockwise so that the center LVDT 124 contacts the center of the outer surface of the panel F. As all the chucking cylinders 84 and 117 are driven forward, all the studpins T are inserted into the corresponding grooves 77, 108. Accordingly, all the studpins T are accorded to have the same height with respect to one another. The depth-detecting LVDTs 83 and 99 detect the burial depth of the corresponding studpin T by the movement of the corresponding rams 75 and 95. When the studpin T is inserted to the groove 108 in the studpin position detecting means 6, an error in the burial position are detected by the vertical and/or horizontal displacement of the float plate 100. Such displacements are respectively detected by the vertical detecting LVDT 113 and the horizontal detecting LVDT 99.

Once the studpins T are inserted into each respective groove the apparatus is checked for whether a switching-on signal is generated from all the pressure switches 79 and 111. An error is indicated if a switching-on signal is not produced from any one of the pressure switches 79 and 111, meaning that the studpins are not properly inserted into the corresponding grooves 77 and 108. If this is the case the rotary cylinder 122 is rotated in a clockwise direction and the apparatus is returned to the initial stage. If an error signal is produced, the user must wait for returning to the initial stage and take away the panel F that ascends from its placement on the panel receptor 16. If a switching-on signal is received from all the pressure switches 79 and 111, operation is normal and all of the air probes 52 are driven forward to contact the outer circumferential surface of the edge of the panel F. The lifting cylinder 25 then operates to ascend so that the curvature detecting LVDTs 21a to 21n of the gauge board 22 contact the inner surface of the panel F. Measured values detected by all the air probes 52 and the LVDTs 58, 83, 99, 113, and 115 are read by a programmable logic controller and processed to determined the measured data of the panel F.

When the processing result of all the measured panel F values are normal, all the air probes 52 are driven rearward, the lifting cylinder 25 descends, the rotary cylinder 122 is rotated counterclockwise, all of the chucking cylinders 84 and 117 are driven rearward, all of the ejecting cylinders 82 and 98 are driven forward, and the transfer cylinder 12 is ascended.

When the processing result of the measured panel F values are not normal, the panel is found to be inferior and an inferior message is generated by a lamp or an alarm is sounded and the above-mentioned returning stage is then entered.

The test is repeated using the apparatus constructed according to principles of this invention by removing the just-tested F from the panel receptor 16 and replacing it with a new panel F' to repeat the test.

Figure 13:
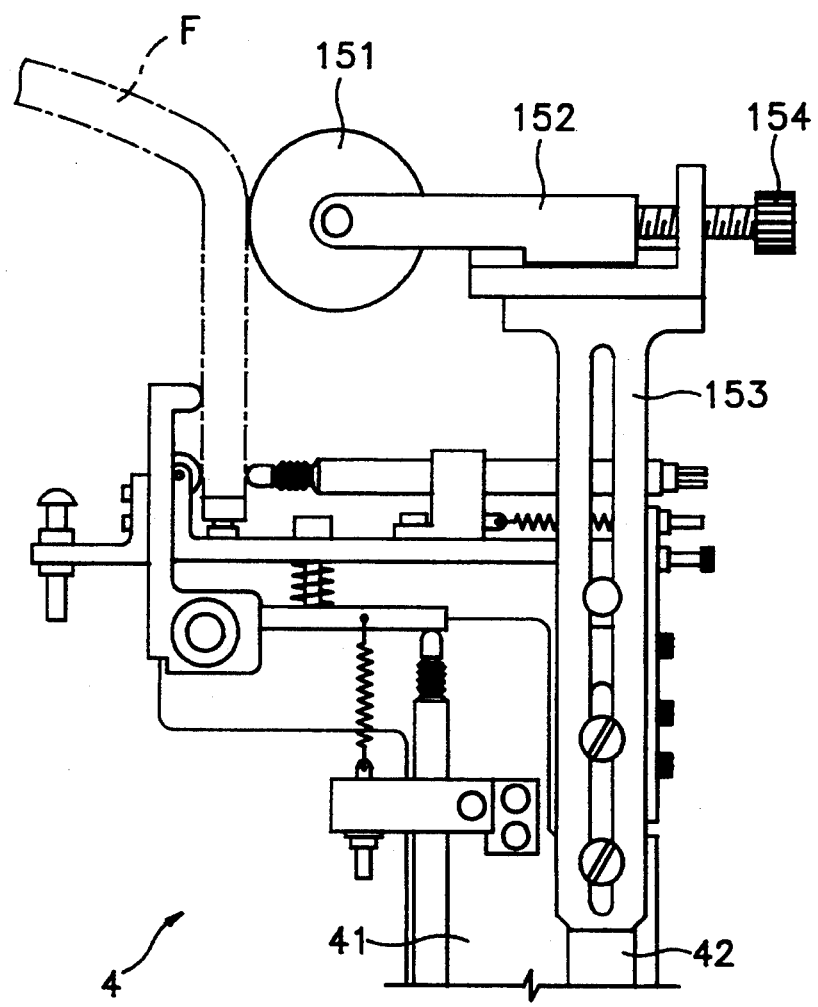
FIG. 13 is a side view showing another embodiment of the edge measuring means depicted in FIG. 9.

The edge measuring means 4 of the present invention includes a guiding means of the panel F, as shown in FIG. 13. The guiding means of the panel F is a roller 151, substantially, and this roller 151 is supported by an arm 152 to contact the outer circumferential surface of the edge of the panel F. The arm 152 is slidably mounted in an orthogonal direction on the upper portion of a pole 153 that is attached to a proper position of the body 41, e.g. the side surface of the rail 42 in order that the height of the pole 153 is adjustable. The slidable movement of the arm 152 is carried out by operating the knob 154 mounted on the end of the arm 152.

The roller 151 is helpful for the exact descent of the panel F. The above embodiments of the present invention is described such that the studpin T is a kind of corner-pin type and is disposed on four corners of the panel, and this is not limited thereto. If the studpin leveling means arranged on the bed and studpin position measuring means are moved to be suitable for a testing panel, a conventional panel may be tested by the present invention.

Although specific embodiments of the panel-testing apparatus have been described herein, many modifications and variations will be apparent to those skilled in the art. Accordingly, it is to be understood that, within the scope of the appended claims, the present invention may be embodied other than that specifically described herein.

What is claimed is:

1. A testing apparatus for measuring curvatures of inner and outer surfaces of a panel for a color picture tube made in a conventional way, the burial location of a studpin, and a thickness of a central surface of the panel, the testing apparatus comprising:
   a panel lifting means for accepting the panel from a supplying position and transporting the panel to a testing position;
   a panel supporting means for maintaining the panel at a predetermined location during use of the apparatus;
   a panel-inner curvature measuring means contacting a plurality of curvature detecting linear variable differential transformers, the transformers measuring the inner curvature of the inner surface of the panel after being placed into the testing position;
   an edge measuring means for measuring an error of the measured thickness of an edge portion of the panel by contacting an outer linear variable differential transformer and an inner linear variable differential transformer to outer and inner surfaces of the panel, respectively;
   a studpin leveling means for measuring a burial depth of each studpin inserted into the panel by means of a depth detecting linear variable differential transformer simultaneously with placing a plurality of the studpins buried on the panel to the same height;
   a studpin position measuring means for measuring a horizontal and/or vertical placement of the studpin by horizontal and vertical linear validity differential transformers, respectively;
   a center surface measuring means contacting an outer central surface of the panel for measuring the thickness of the outer central surface of the panel; and
   a plurality of guiders for guiding ascent and descent of the panel with respect to the apparatus.

2. The testing apparatus as recited in claim 1, wherein said panel lifting means comprises:
   a base frame;
   a bed supported by said base frame;
   arms vertically mounted to penetrate said bed and having panel receptors on upper ends of said arms;
   a transfer plate supporting said arms;
   a transfer cylinder disposed on a bottom most portion of said base frame; and
   a sensor for perceiving a descent point of said transfer plate.

3. The testing apparatus as recited in claim 2, wherein one side end of said panel receptors is penetrated by holes formed in advance, the panel receptor being fixedly mounted in a holder by set-screws.

4. The testing apparatus as recited in claim 1, wherein said panel inner curvature measuring means comprises:
   a plurality of curvature detecting linear variable differential transformers for measuring a curvature of an inner circumferential surface of said panel;
   a gauge board supporting said curvature detecting linear variable differential transformers disposed in a vertical posture;
   a lifting board supporting said gauge board under said gauge board;
   a lifting cylinder disposed under the bed for the purpose of lifting said lifting board;
   guide bars having upper ends vertically fixed to penetrate said bed for the purpose of guiding said lifting board; and
   a guide board fixedly mounted over the bed and being penetrated by the upper ends of the guide bars by the lifting of the lifting board; and
   posts having upper ends vertically extending from an upper surface end of said guide board to support the panel.

5. The testing apparatus as recited in claim 4, wherein a buffer stopper extends from a backside surface of the guide board and a center protrusion extends from an upper surface of the lifting board, contact between the buffer stopper and center protrusion serving to limit the movement of the lifting board.

6. The testing apparatus as recited in claim 1, wherein the edge measuring means comprises:
   four pairs of edge measuring bodies disposed at predetermined points on the upper surface of the bed;
   a jack plate mounted on one side of each body, the jack plate having an adjustable height with relation to the body;
   a bracket having one end supported by said jack plate and the other end suspended by a spring in an upper direction of the body for the purpose of controlling the level of the bracket;
   an outside air-probe fixed by a linear variable differential transformer holder on said bracket to vertically contact an outer circumferential surface of the panel;
   an inner linear variable differential transformer fixed vertically on said body;
   an L-shaped lever having one end contacting said inner linear variable differential transformer, the other end contacting an inner circumferential surface of the edge of the panel, a height-adjuster activated by a descent of said gauge board, the L-shaped lever being rotatably supported by an axial member on a predetermined point of the body; and a spring applying an elastic force of a predetermined direction to said L-shape lever.

7. The testing apparatus as recited in claim 6, wherein said bracket of the edge measuring means has a free end extending so as to be adjacent to an inner surface of the edge of the panel, the free end supporting a roller for engaging the inner surface of the edge of the panel.

8. The testing apparatus as recited in claim 6, wherein said jack plate of the edge measuring means is connected to one end of the bracket by a link.

9. The testing apparatus as recited in claim 6, wherein the edge measuring means comprises a pole is fixedly attached to said body and an arm slidably mounted in an orthogonal direction on the pole, the arm having a roller at its end for purposes of engaging an outside surface of the panel.

10. The testing apparatus as recited in claim 7, wherein the bracket of the edge measuring means comprises a slot at a free end and an adjusting bolt for controlling a horizontal height of the bracket, the adjusting bolt penetrating the slot and being connected to the body via a center of a spring.

11. The testing apparatus as recited in claims 7 or 10, wherein an edge prop is disposed between the outside air-probe and the roller supported at the free end of the bracket, the edge prop serving to accommodate an edge portion of the panel.

12. The testing apparatus as recited in claim 2, wherein said studpin leveling means includes:

a body disposed on three predetermined points of an upper surface of said bed;

a ram slidably mounted on an upper surface of the body, the ram having a studpin chucking board extending orthogonally from a free end of the;

a chucking cylinder is fixedly disposed over the ram so that said ram to be opposite the chucking board, the chucking cylinder accommodating the slidable movement of a chucking point against an outer circumferential surface of the panel;

a groove formed at a predetermined point on the upper surface of the studpin chucking board, the groove being oriented opposite to the studpin of the panel;

a path within said chucking board linking said groove to an opposite surface of the studpin chucking board;

a pressure switch contacting said path for perceiving the existence of the studpin inserted into the groove by the chucking cylinder;

a depth detecting linear variable differential transformer fixed to said body so as to measure a burial depth of the studpin by contacting a lower end of the studpin chucking board; and an ejecting cylinder mounted in said body opposite to the lower end of the studpin chucking board, the operation of the ejecting cylinder causing the studpin to be pushed away from and exit the groove.

13. The testing apparatus as recited in claim 12, wherein the body of the studpin leveling means comprises a lower body fixed on the bed and an upper body slidably supported on an upper surface of the lower body, said upper body having a nut portion that moves along a screw rotated by a knob.

14. The testing apparatus as recited in claim in accordance with the claim 2, wherein said studpin position measuring means comprises:

a body disposed on one point of an upper surface of the bed;

a ram slidably mounted on the upper surface of the body and having a vertical plate extending orthogonally at its one end;

a spring applying an elastic force of a predetermined direction to said ram;

a float plate attached to an upper surface of the ram and supported to be vertically and horizontally rotatable about the ram and having a studpin detecting board extending orthogonally from a free end;

a groove formed on an upper portion of said studpin detecting board positioned opposite to the studpin of the panel;

a protrusion formed on the upper portion of said studpin detecting board on a surface opposite to the groove, the studpin detecting board having a path therethrough linking the groove to the protrusion;

a tip formed on a location near said protrusion;

a mediator disposed at an upper portion of the vertical plate and connected to the protrusion, the mediator serving to shake said protrusion;

a chucking cylinder fixedly mounted on said float plate operating a the slidable movement of a chucking point toward an outer circumferential surface of the panel;

a pressure switch contacting the path of said protrusion and perceiving the existence of the studpin inserted into the groove by the engagement of the chucking point against the panel;

a depth detecting linear variable differential transformer fixed at a predetermined point to said body serving to measure a burial depth of the studpin via slidable movement of the ram and displacement of a lower portion of the vertical plate;

a horizontal detecting linear variable differential transformer disposed on a side surface of the vertical plate and measuring movement of the protrusion concerning a burial position of the studpin through said mediator;

a vertical detecting linear variable differential transformer disposed on a side surface of the vertical plate and linked to the tip to measure a burial height of the studpin; and an ejecting cylinder disposed opposite to the lower portion of the vertical plate on the body to pull out the studpin inserted into the groove.

15. The testing apparatus as recited in claim 14, wherein said body of the studpin position measuring means includes:

a lower body fixed on the bed;

an upper body supported slidably on a top surface of said lower body; and a nut portion within the upper body for accommodating the slidable movement of the upper body in relation to the lower body by the rotation of a screw engaging said nut.

16. The testing apparatus as recited in claim 14, wherein said ram of the studpin position measuring means comprises a spring seat at opposite sides, a spring is attached at each end to a spring seat to exert a pressure force on the float plate disposed therebetween for retaining the float plate in a constant position.

17. The testing apparatus as recited in claims 14 or 16, wherein said ram of the studpin position measuring means comprises a journal bearing pivoting on an arbor at one side end, and said float plate being hingedly attached to said arbor by a pin.

18. The testing apparatus as recited in claim 2, wherein said center surface measuring means comprises:
- a column disposed on a predetermined point of said bed;
- a rotary cylinder mounted on an upper portion of said column;
- an arm extending from an axis of said rotary cylinder;
- a center linear variable differential transformer orthogonally attached to a free end of said arm in order to contact a center portion of an outside surface of the panel; and
- a height controlling means disposed at a lower point of said arm at a side of said rotary cylinder so as to control a horizontal height of said arm.

19. The testing apparatus as recited in claim 18, wherein said column of the center surface measuring means comprises at least one stopper to define a predetermined range of vertical and horizontal rotation.

20. The testing apparatus as recited in claim 2, wherein said panel supporting means comprises:
- a balance cylinder mounted vertically on an upper surface of the bed;
- a shank connected integrally to a piston rod of said balance cylinder and having a groove formed along an outer surface; and
- a shaking cap having a plurality of rollers at its inner circumferential surface, the rollers being inserted into said groove and covering an outer surface of said shank.

* * * * *

UNITED STATES PATENT AND TRADEMARK OFFICE
CERTIFICATE OF CORRECTION

PATENT NO. : 5,426,862
DATED : June 27, 1995
INVENTOR(S) : Chung-sik Ham; Jong-duk Kim; Ho-sung Lee It is certified that error appears in the above-indentified patent and that said Letters Patent is hereby corrected as shown below:

```
Abstract, line 10, after "which" insert -- is --.
Abstract, line 18, after "which" insert -- is --.

Column 2, line 61, after "view" insert -- of --.

Column 3, line 17, delete "the" (second occurrence).
Column 3, line 50, change "show" to -- shows --.

Column 5, lines 29,31,36,40,44,46,50,53, change "L-shape"
          to -- L-shaped -- (all occurrences).

Column 6, line 23, change "times" to -- time --.

Column 9, line 9, change "appeared" to -- appearing --.
Column 9, line 30, change "partially" to -- partial --.
Column 9, line 31, change "appeared" to -- appearing --.
Column 9, line 32, change "shape" to -- shaped --.

Column 10, line 31, change "are" to -- is --.
Column 10, line 58, change "determined" to
           -- determine --.

Column 13, line 6, change "L-shape" to -- L-shaped --.
Column 13, line 16, change "comprises" to
           -- comprising --.
Column 13, 39, after "end of the" insert -- ram --.
```

UNITED STATES PATENT AND TRADEMARK OFFICE
CERTIFICATE OF CORRECTION

PATENT NO. : 5,426,862

DATED : June 27, 1995

INVENTOR(S) : Chung-sik Ham; Jong-duk Kim; Ho-sung Lee

It is certified that error appears in the above-indentified patent and that said Letters Patent is hereby corrected as shown below:

Column 14, line 1, change "apparatus as recited in claim in accordance with the claim 2" to -- apparatus as recited in claim 2 --.

Column 14, line 28, after "operating" change "a" to -- at --.

Column 16, lines 10,13, change "balance" to -- balanced -- (both occurrences).

Signed and Sealed this

Fifth Day of March, 1996

Attest:

BRUCE LEHMAN

Attesting Officer

Commissioner of Patents and Trademarks